(12) United States Patent
Fuchik et al.

(10) Patent No.: US 7,489,051 B2
(45) Date of Patent: Feb. 10, 2009

(54) ADAPTIVE POWER SYSTEM WITH IMPROVED EFFICIENCY AND DISTRIBUTION SPACE REDUCTION

(75) Inventors: John S. Fuchik, Delaware, OH (US); James K. Martin, Galena, OH (US); Russell E. Shetler, Jr., Delaware, OH (US); William A. Barcus, Worthington, OH (US); Peter A. Panfil, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 11/756,185

(22) Filed: May 31, 2007

(65) Prior Publication Data
US 2008/0144245 A1    Jun. 19, 2008

Related U.S. Application Data

(60) Provisional application No. 60/870,755, filed on Dec. 19, 2006.

(51) Int. Cl.
*H02J 1/10* (2006.01)
*H02J 3/38* (2006.01)
*H02J 7/34* (2006.01)
*H02J 3/06* (2006.01)
*H02J 1/12* (2006.01)
*H02J 3/02* (2006.01)
*H02J 9/00* (2006.01)
*H02H 3/00* (2006.01)
*H02H 7/00* (2006.01)

(52) U.S. Cl. .............. 307/18; 307/19; 307/21; 307/22; 307/23; 307/65; 361/2

(58) Field of Classification Search ............... None
See application file for complete search history.

(56) References Cited

U.S. PATENT DOCUMENTS 7,129,599 B2 * 10/2006 Divan et al. ............... 307/65

(Continued)

OTHER PUBLICATIONS

Uninterruptible Power Supply, Wikipedia, [online], [retrieved online on Dec. 7, 2006 using <URL: http://en.wikipedia.org/wiki/Uninterruptible_power_supply>, 6 pages.

(Continued)

*Primary Examiner*—Stephen W Jackson
*Assistant Examiner*—Dharti H Patel
(74) *Attorney, Agent, or Firm*—Locke Lord Bissell & Liddell LLP

(57) ABSTRACT

The present disclosure provides a method and system using a power protector, such as an uninterruptible power supply (power protector) or a power line conditioner. An input of the power protector can be coupled to an output of one or more of circuit breakers using electrical buss bars for unique modularity and easy installation and replacement. Further, an input of a second set of circuit breakers can be coupled to an output of the power protector to backfeed the power through the second set of circuit breakers and out through the buss bar to one or more electrical loads. Additional power protectors can be used for capacity and/or redundancy. A stacked buss bar system can be used that consolidates the system into a compact assembly heretofore unknown in the industry. In at least some embodiments, the system can be compatible with standard panelboards having circuit breakers disposed therein.

20 Claims, 6 Drawing Sheets

U.S. PATENT DOCUMENTS

2007/0052294 A1* 3/2007 Kraus .......................... 307/65

OTHER PUBLICATIONS

Symmetra MW 1000kW Frame, 480 v, [online], [retrieved online on Nov. 14, 2006 using <URL: http://www.apc.com/resource/include/techspec_index.cfm?base_sku=SYMF1000KG&ta...>, 3 pages.

Symmetra MW, [online], [retrieved online on Nov. 14, 2006 using <URL: http://www.apc.com/products/family/index.cfm?id=185>, 2 pages.

Infrastruxure 80kW UPS, Dwg. No. ISX-80K80R1F2NSFRDP-SD schematic, American Power Conversion, 1 page.

Symmetra PX80 with Silcon Bypass Panel, Dwg. No. SYPX-SBP-80K8OR1F1-WB schematic, American Power Conversion, 1 page.

Symmetra PX 80kW Scalable to 80kW N+1 with Premium XR Battery Enclosure, 208v, [online], [retrieved online on Nov. 14, 2006 using <URL: http://www.apc.com/resource/include/techspec_index.cfm?base_sku=SY80K80F>, 4 pages.

Symmetra MW 1200-1600kw brochure, 2 pages.

1200 A Powerpact P- and R-Frame Circuit Breakers I-Line Panelboards Square D Schneider Electric, 2 pages.

Speed-D Service Section Switchboards, Square D Schneider Electric, 2002, 8 pages.

I-Line Plug-On Unit with Surgeloogic TVSS, Square D Schneider Electric, 2001, 2 pages.

Powerpact H- and J-Frame 15A to 250A Circuit Breakers in Panelboards, Square D Schneider Electric, 2 pages.

Modular Panelboard System, Square D Schneider Electric, 4 pages.

Symmetra MW System with External Bypass SSW—User Guide, 2004 American Power Conversion, www.apc.com, 54 pages.

Symmetra PX 80kW Scalable to 80kW N+1 with Premium XR Battery Enclosure, 208v, [online], [retrieved online on Nov. 14, 2006 using <URL: http://www.apc.com/resource/include/techspec_index.cfm?base_sku=SY80K80F&tab=co...>, 5 pages.

* cited by examiner

ADAPTIVE POWER SYSTEM WITH IMPROVED EFFICIENCY AND DISTRIBUTION SPACE REDUCTION

CROSS REFERENCE TO RELATED APPLICATIONS

This application claims the benefit of U.S. Provisional Appl. No. 60/870,755, filed Dec. 19, 2006, and is incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO APPENDIX

Not applicable.

BACKGROUND

1. Field of the Invention

The invention relates to electrical protective devices. More specifically, the invention relates to electrical protective devices mounted in collective assemblies.

2. Description of Related Art

As technology allows for further consolidation of circuitry, systems are becoming more compact. However, such compact considerations have been slow to implement in the field of electrical protective devices, such as circuit breakers and panelboards. The standard power distribution system includes typically one or more incoming power feed lines inserted through the top or bottom of a panelboard. The feed lines are connected to a main circuit breaker to switch overall power to the panelboard. From the main circuit breaker, the power from the feed lines is connected to longitudinal buss bars. A buss bar is used for each "hot" feed, typically one to three, with a central buss bar used for the neutral feed line and a ground. One or more circuit breakers are coupled to the buss bars. Typically, one or two vertical rows of circuit breakers are coupled to the buss bars. Distribution branch lines from the circuit breakers connect to electrical loads, such as motors and other electrical equipment, control systems, and other devices using electrical power.

With data processing centers, medical instrumentation, and other power sensitive equipment becoming prevalent, the electrical supply industry has sought ways to provide "clean" electrical power without interruption for such sensitive electrical loads. Uninterruptible power supply (UPS) devices are typically enclosed units with a battery and a control system that activates when the main AC power is interrupted to provides smooth DC power in a synthesized AC waveform. Thus, the electrical load often does not experience a substantive change in power during the interruption as long as the UPS battery can supply the power. Other protection can be gained without the battery backup by power line conditioners, known to those with ordinary skill in the art, that clean the incoming power. In some branch distribution lines, a UPS or power line conditioner can be hardwired between a circuit breaker and an electrical load. In actuality, the amount of wiring and components with controls can be enormous for some systems. The large amount contributes to a probability of downtime failure and the complexity contributes to difficulty with on-site repair in an efficient and timely manner. At times, the whole system has to be shut down to complete otherwise straightforward repairs.

Some vendors have sought to provide large systems for high KVA electrical loads that include the circuit breakers and UPS capabilities. A system offered by a popular vendor however is incompatible with standard panelboards. The main power feed lines are attached to non-standard locations in the cabinet and power is routed throughout the cabinet by buss bars to the various circuit breakers. A separate battery cabinet is attached to the circuit breaker cabinet for specific applications and hardwired together with the circuit breaker cabinet. The system is of such a design that the ultimate electrical load is required in an initial rating, and then the system is prewired with a large number of installed components that increases initial costs. To complete the system, power modules are installed into bays. If the system needs change, a significant amount of rewiring and design is required.

Thus, there remains a need to provide an electrical power system with UPS capabilities that can simplify the wiring and installed components, and advantageously be compatible with standard panelboards and circuit breakers mounted therein.

BRIEF SUMMARY

The present disclosure provides a method and system using a power protector, such as an uninterruptible power supply (UPS) or a power line conditioner. An input of the power protector can be coupled to an output of one or more of circuit breakers using electrical buss bars for unique modularity and easy installation and replacement. Further, an input of a second set of circuit breakers can be coupled to an output of the power protector to backfeed the power through the second set of circuit breakers and out through the buss bar to one or more electrical loads. Additional power protectors can be used for redundancy. A stacked buss bar system can be used that consolidates the system into a compact assembly heretofore unknown in the industry. In at least some embodiments, the system can be compatible with standard panelboards having circuit breakers disposed therein The disclosure provides a power protection system, comprising: a first electrical buss bar system having at least one buss bar and a second electrical buss bar system having at least one buss bar; a first infeed circuit breaker having an input coupled to the first electrical buss bar system, an output, and a protection device disposed between the input and the output for an electrical current overload condition; a power protector having an input and an output, the power protector input being coupled to the first infeed circuit breaker output; a first outfeed circuit breaker coupled to the second electrical buss bar system, the first outfeed circuit breaker having an input and an output and a protection device disposed between the input and the output for an electrical current overload condition, the input of the first outfeed circuit breaker being coupled to the power protector output, the output of the first outfeed circuit breaker being coupled to the second electrical buss bar system to allow backfeed of electrical current into the second electrical buss bar system, and the second electrical buss bar system being adapted to be coupled to one or more electrical loads.

The disclosure further provides a method of providing electrical protection to a circuit, comprising: providing in a first electrical buss bar system having at least one buss bar and a second electrical buss bar system having at least one buss bar; coupling an input of a first infeed circuit breaker to the first electrical buss bar system; coupling an input of a first power protector to an output of the first infeed circuit breaker; coupling an output of the first power protector to an input of a first outfeed circuit breaker; coupling an output of the first outfeed circuit breaker to the second electrical buss bar system; and allowing backfeed of electrical current into the second electrical buss bar system through the power protector, and the second electrical buss bar system being adapted to be coupled to one or more electrical loads.

BRIEF DESCRIPTION OF THE DRAWINGS

While the concepts provided herein are susceptible to various modifications and alternative forms, only a few specific embodiments have been shown by way of example in the drawings and are described in detail below. The figures and detailed descriptions of these specific embodiments are not intended to limit the breadth or scope of the concepts or the appended claims in any manner. Rather, the figures and detailed written descriptions are provided to illustrate the concepts to a person of ordinary skill in the art as required by 35 U.S.C. § 112.

DETAILED DESCRIPTION

One or more illustrative embodiments of the concepts disclosed herein are presented below. Not all features of an actual implementation are described or shown in this application for the sake of clarity. It is understood that the development of an actual embodiment, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1:
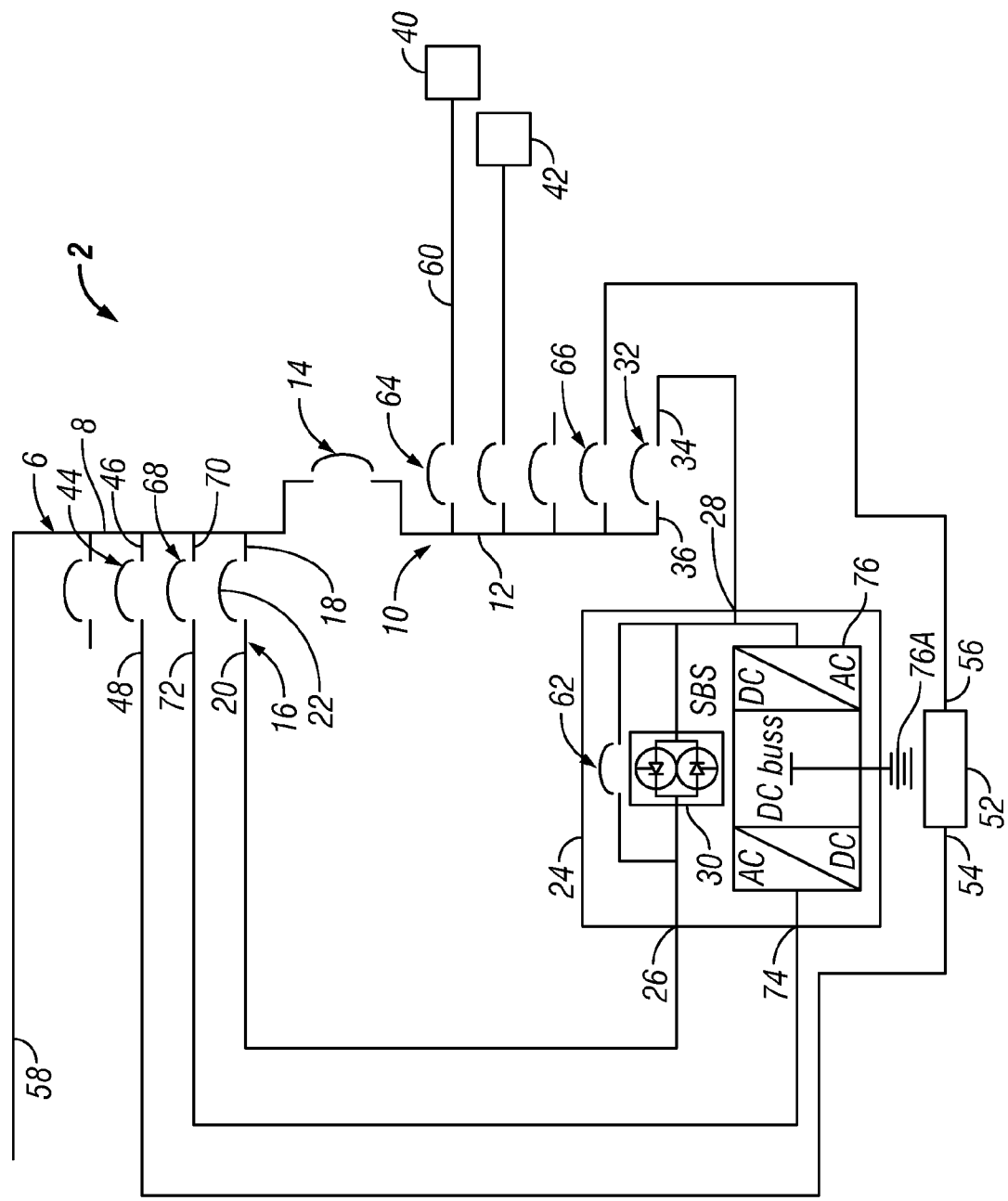
FIG. 1 is a schematic electrical circuit diagram of an exemplary power protection system.

FIG. 1 is a schematic electrical circuit diagram of an exemplary power protection system. A power protection system 2 generally includes a plurality of electrical buss bar systems, circuit breakers coupled thereto, and a power protector coupled there between. Voltages, current ratings, and the number of phases are all exemplary and the values can change for different systems. A first electrical buss bar system 6 includes at least one buss bar 8 and a second electrical buss bar system 10 includes a buss bar 12. The first electrical buss bar system can be electrically separated from the second electrical buss bar system, so that current can only flow in a controlled fashion between the buss bars. The term "power protector" is intended to include UPSs and power conditioners. While most UPSs have batteries or some additional power supply independent of incoming power, some power conditioners have no additional power supply but stabilize or "clean" the power output. Most embodiments of a UPS automatically condition the incoming power to produce "cleaned" output power.

Generally, a system input 58 will be conducted through the power protector described herein. In at least one embodiment, the protection system 2 allows current to be conducted through the first electrical buss bar system, through the power protector, and back feed into the second electrical buss bar system, so the output from the second electrical buss bar system is actually conducted in a reverse direction than is customarily done. The system can use existing buss bar structures and eliminate a significant number of wires and space requirements.

A bypass switch 14, known to those with ordinary skill in the art, can be installed between the first and second buss bar systems. The bypass switch can allow the system input 58 to be conducted through the first electrical buss bar system 6 through the bypass switch 14 and into the second electrical buss bar system 10 during abnormal conditions. In at least one embodiment, the bypass switch 14 can be a circuit breaker. The bypass switch can include a dual stab structure such that the bypass switch can be coupled on a first side by inserting the switch into the buss bar system 6 in a fashion similar to a circuit breaker and also be coupled to the second electrical buss bar system 10 on a distal side in a similar fashion.

The power protector can be sized for different current electrical loads, often rated as volt amps ("VA") or at higher electrical loads kilovolt-amps ("KVA"). Further, when a plurality of power protectors are used, the power protectors can be rated at different electrical loads, so that different combinations of power protectors can conduct different combinations of cumulative electrical loads. Advantageously, in at least some embodiments, the power protectors can be inserted and removed from the power protection system 2 by electrically isolating the particular power protector from the output of the first electrical buss bar system 6 and the input of the second electrical buss bar system 10. Thus, the remainder of the power protectors can be operational while service or replacement is performed on the isolated power protector.

In at least one embodiment, an advantageous buss bar structure can be a stacked buss bar structure. One commercial available buss bar system is the I-Line system available from the Square D Company. The buss bar system in the I-Line configuration is particularly compact in that the buss bars are stacked in a vertical arrangement, as opposed to the more common lateral arrangement. Thus, less room is needed. While the I-Line configuration is particularly efficient, any compatible buss structure and any compatible power protector can be used with the system. The system can be adapted to isolate the buss bar so that there is formed a first electrical buss bar system electrically separated from the second electrical buss bar system, the current passes through a power protector installed between the insolated buss bar systems with the appropriate circuit breakers as has been described above.

Another advantage of the system, in at least one embodiment, is that the power protector can be powered from the first electrical buss bar system but isolated from the second electrical buss bar system. Thus, the power protector can be tested and powered prior to releasing it into the system output 60. Further, the power protector can be tested by closing the input, opening the output, and testing the power protector capabilities, battery life, frequency synchronization, and other aspects as may be appropriate for the system.

Another further advantage of the system is that parallel power protectors can be installed on the system relatively simply. To install another power protector, another circuit breaker can be installed and coupled to the first electrical buss bar system 6 and another circuit breaker can be installed and coupled to the second electrical buss bar system 10. The power protector can be coupled to both circuit breakers with additional capabilities in the system. This approach radically differs from known efforts available in the marketplace that require significant rewiring or prewired capability upon initial installation. Further, it differs from prior efforts that generally would require shutting down the power connection system 2 to include the additional components.

Further describing the structure of the exemplary embodiment, the buss bar 8 of the first electrical buss bar system 6 can be coupled to a first infeed circuit breaker 16. The infeed circuit breaker can include an input 18 coupled to the buss bar 8 and an output 20. The output 20 can be coupled to a power protector 24, such as an uninterruptible power supply (UPS) or a power line conditioner. Specifically, the output 20 of the first infeed circuit breaker 16 can be coupled to an input 26 of the power protector 24. The power protector can be a number of different embodiments of UPS units known to those with ordinary skill in the art and can include such styles as rotary, standby (offline), line-interactive, delta conversion online, dual conversion online, ferro-resonant, and other types as may be known. Power line conditioners can include known types, such as tap switcher, ferro-resonant, power factor correctors, and other types, such as the above exemplary UPS types, sometimes without the battery, except for the standby which is normally offline and would not normally condition the power.

In the example illustrated in FIG. 1, the exemplary power protector 24 has at least one input 26 and an output 28. A mechanical switch 62 is coupled in parallel with an electrical static bypass switch 30 between the input 26 and the output 28. An AC converter 76 with additional power protection circuitry and a battery 76A, if provided, can form a portion of the power protector. The mechanical switch 62 can be used for initial startup and shutdown of the power protector. The electrical static bypass switch 30 can be actuated electrically and in some embodiments remotely to allow current to flow through the power protector independent of the mechanical switch 62. The AC converter 76 portion of the power protector 24 is primarily used to regulate and in some embodiments provide temporary power to the system 2. The current can pass through the AC converter 76 and be formed into a synthesized AC wave form and flow into the output 28 of the power protector.

The output of the power protector can be coupled an input 34 of a first outfeed circuit breaker 32. The output 36 of the first outfeed circuit breaker 32 can be coupled to the buss bar 12 of the second electrical buss bar system 10. The current conducted into the buss bar 12 can flow out of the second electrical buss bar system 12 as a system output 60. The system output 60 can provide electricity to an electrical load 40. In other embodiments, a plurality of electrical loads 40, 42 can be powered by one or more system outputs. Further, one or more of the electrical loads can be protected from the current conducted through the buss bar 12 by a circuit breaker 64 coupled to the buss bar 12 through which the system output 60 is conducted.

The disclosure provides a unique system that protects power delivered to an electrical load by efficiently interposing a power protector between electrical buss bar systems. In prior arrangements, the circuit may be protected, but the output of the power protector is directed to individual or collective electrical loads. The output of the power protector US has not been wired back into an electrical buss bar system to the knowledge of the inventors. The system uses an electrical buss bar system to collect and aggregate the incoming current through an efficient structure by feeding current from the power protector into an output of a circuit breaker and back into the buss bar. Thus, the current is fed in a reverse direction out of one or more of the circuit breakers in what would normally be an output of the electrical buss bar system. The result is a compact, reduced wiring, efficient enclosure that heretofore has been sought but not developed.

Additional circuit breakers and power protectors can be installed in the system. In some embodiments, additional power protectors can be used one or more as spares. A plurality of power protectors can be operational under normal circumstances and an additional power protector installed that is sized to conduct the electrical load of each of the other power protectors. If one power protector fails, the other power protectors can continue to provide a portion of the electrical load and the spare power protector can replace the function and conduct the current of the failed power protector. Referring to FIG. 1, for example, a second infeed circuit breaker 44 can be coupled to the first electrical buss bar system 6 at an input 46 of the second infeed circuit breaker 44. An output 48 of the second infeed circuit breaker can be coupled to an input 54 of a second power protector 52. An output 56 of the second power protector 52 can be coupled to second electrical buss bar system 10, such as a second outfeed circuit breaker 66. The second outfeed circuit breaker 66 can be coupled to the buss bar 12 in a similar fashion as the first outfeed circuit breaker 32. In some embodiments, the electrical current can be accumulated through a plurality of power protectors.

To service the power protector 24, the AC converter 76 can be turned off and the static bypass switch 30 switched on, so that current can flow through the electrical static bypass switch to the output 28. If necessary, the switch 62 can be switched on and the static bypass switch 30 switched off as well. If the entire power protector 24 needs servicing or removal, the circuit breaker 22 and 32 can be switched off to isolate current from the power protector.

FIG. 1 further illustrates a dual AC input into the power protector 24. For example, a third infeed circuit breaker 68 can be coupled through an input 70 to the first electrical buss bar system 6, so that an output 72 of the circuit breaker 68 is coupled to another input 74 of the power protector 24. The input 74 can be directed toward an AC converter 76. The AC converter 76 can be coupled to the output 28 of the power protector 24.

In at least one embodiment, the system can include an input of 480 volts, such as three phase with ground, and have an output of 480 volts with no transformer. In other embodiments, the output voltage can change from the input voltage by use of transformers or other voltage changing devices. The power ratings can also vary and in at least some embodiments, the system can provide a power system rated for 40 KVA to 200 KVA and in other embodiments to 1200 KVA. It is understood that a wide variety of voltages and power capacities can be realized by using different components, by assembling the units in various parallel capacities to establish power capacities of the overall system. Further, the power capacities can be adjusted in a stepped fashion by applying different combinations of different rated components. Different combinations that are removably assembled or switched on and off yield different combinations of power capacity ratings. For example and without limitation a KVA rating of a system using various combinations of and 80 KVA and 120 KVA components would yield an 80 KVA capacity, 120 KVA capacity, and a 200 KVA capacity when combined. Similar examples could be given for a 60 KVA and 100 KVA units in a system and 40 KVA and 80 KVA units in a system. Still other combinations can occur from using a system having 40 KVA, 60 KVA, 80 KVA, 100 KVA, and 120 KVA units. The above references to voltages, power capacities, and combinations are merely exemplary and in no way to be interpreted as limiting.

Figure 2:
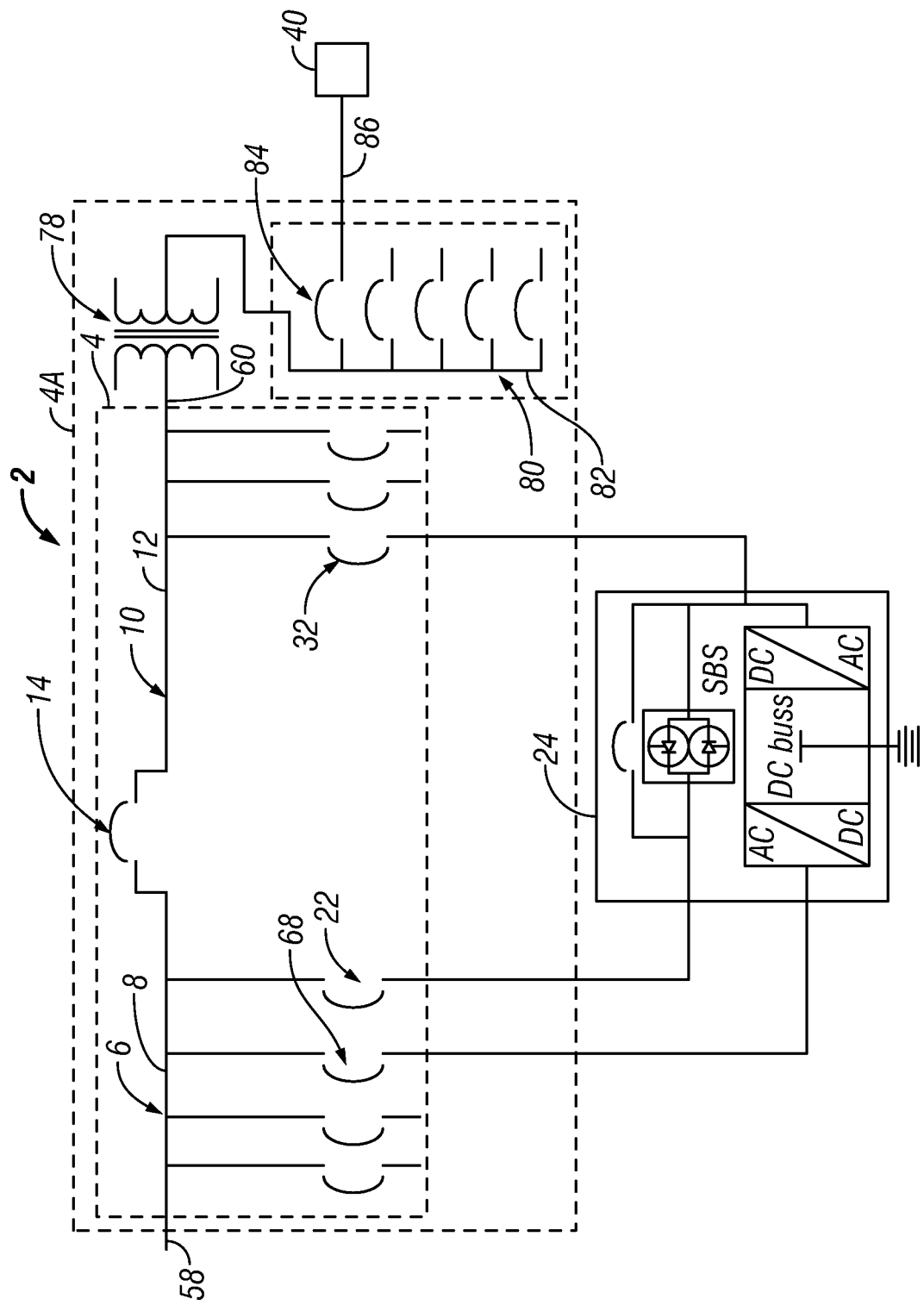
FIG. 2 is a schematic electrical circuit diagram of another exemplary embodiment having a transformer.

FIG. 2 is a schematic electrical circuit diagram of another exemplary embodiment having a transformer. Similar elements were similarly numbered as have been described above. Advantageously, the first electrical buss bar system and the second electrical buss bar system can be included in a panelboard 4, such as a standard cabinet. However, it is to be understood that one or more of the buss bar systems can be installed in separate cabinets. Thus, the various embodiments described herein are representative and the disclosure is not limited to the cabinet assemblies described or shown.

The first electrical buss bar system 6 having a buss bar 8 can be coupled to one or more circuit breakers, 22, 68. The circuit breakers can provide power to the power protector 24 which in turn can backfeed power into the second electrical buss bar system 10 having a buss bar 12 through a first outfeed circuit breaker 32. The output 60 of the second electrical buss bar system 10 can be directed to a transformer 78. The transformer 78 can transform the voltage in the output 60 to a different voltage as may be suitable for one or more electrical loads, such as the electrical load 40. The output of the transformer 78 can be directed into a transformed buss bar system 80. The transformed buss bar system 80 can similarly have a buss bar 82 which can be coupled to one or more circuit breakers 84. The output 86 from the one or more circuit breakers 84 can be directed toward the electrical load 40. The transformer 78 and the supplemental transformed buss bar system 80 can be enclosed within a panel board 4A with the first and second electrical buss bar systems 6, 10 or be separated therefrom.

Figure 3:
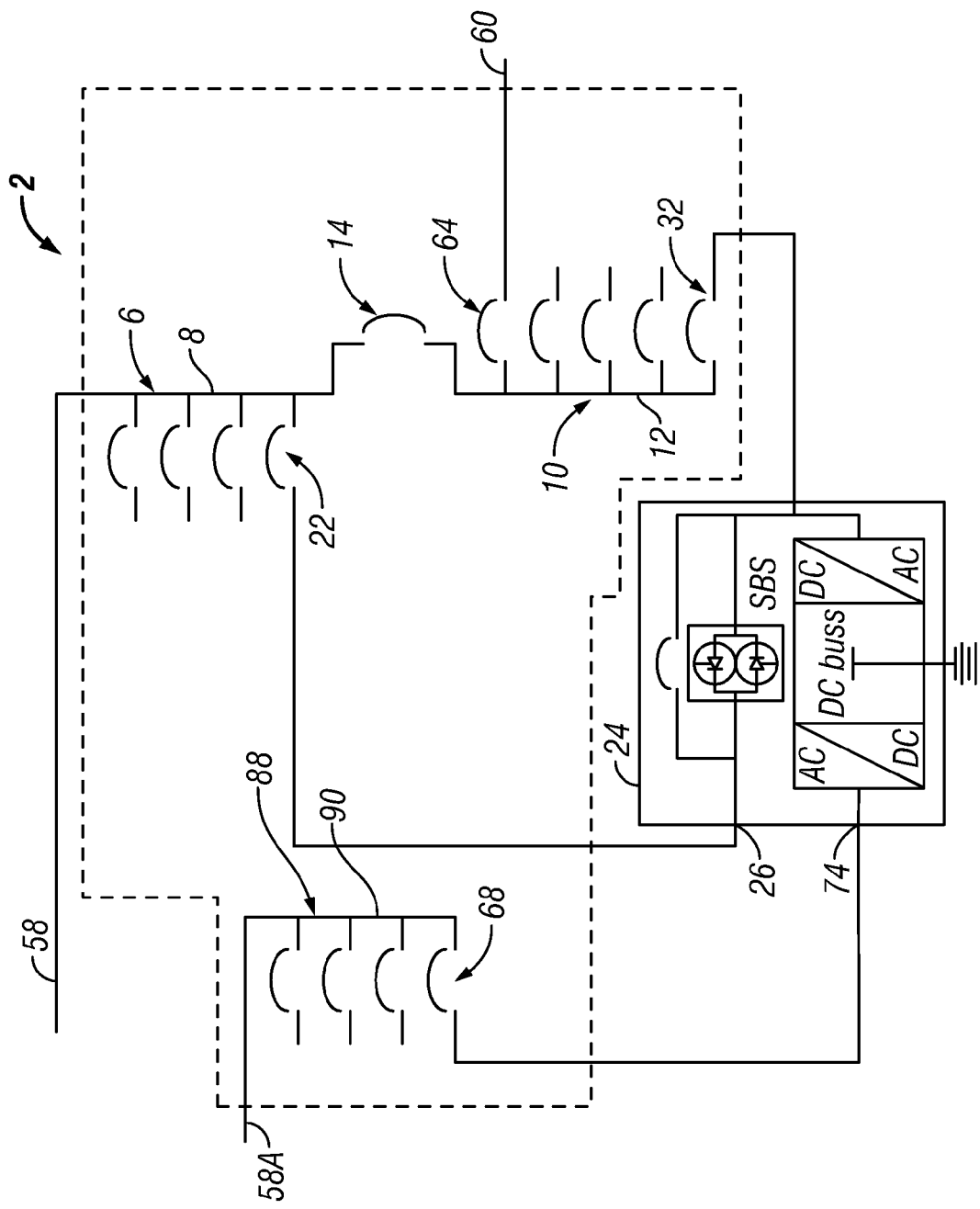
FIG. 3 is a schematic diagram of another exemplary embodiment of the power protection system.

FIG. 3 is a schematic diagram of another exemplary embodiment of the power protection system. Similar elements are similarly numbered. The power of the system input 58 can be split into multiple infeeds. For example, the system input 58 can be directed, as has been described, to the first electrical buss bar system 6 having a buss bar 8 and into the circuit breaker 22. The current can then be directed to an input of the power protector 24 and out to backfeed into the first outfeed circuit breaker 32, into the buss bar 12 of the second electrical buss bar system 10, and out through the circuit breaker 64 to establish the system output 60. A supplemental system input 58A can be directed to a supplemental electrical buss bar system 88 having a buss bar 90 with a circuit breaker 68 coupled thereto. The current is conducted through the circuit breaker 68 to an input 74 of the power protector 24 different from the input 24 of the power protector. Thus, the system can provide independent actuation of different portions of the power protector 24 as may be suitable for protection, for sizing requirements, and other aspects as might be known to those with ordinary skill in the art given the disclosure contained therein.

Figure 4:
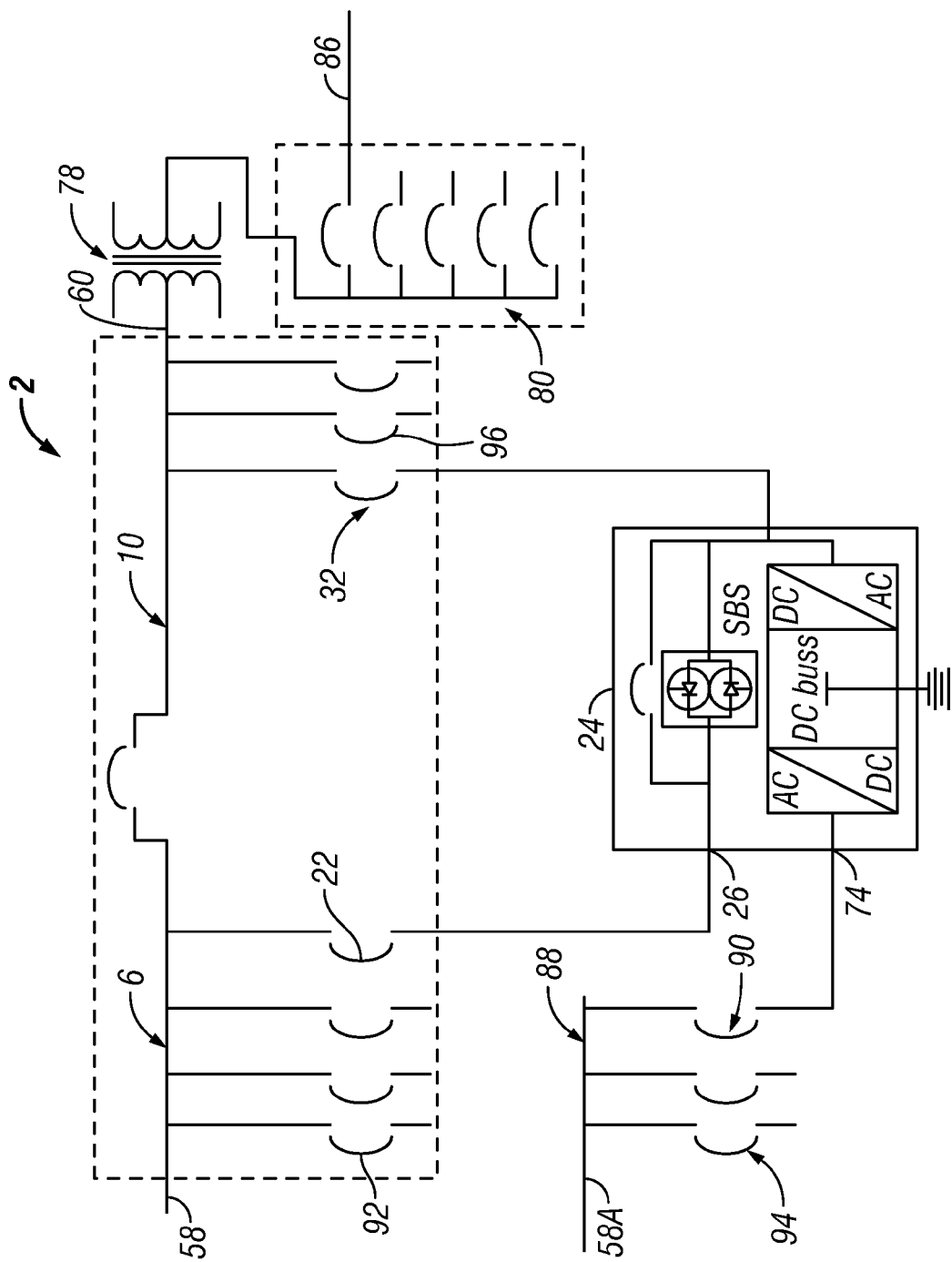
FIG. 4 is a schematic diagram of another exemplary embodiment of the power protection system.

FIG. 4 is a schematic diagram of another exemplary embodiment 2 of the power protection system. Similar elements have been described above. FIG. 4 illustrates the combination of the prior described FIGS. 2 and 3 where a system input 58 is directed through a first electrical buss bar system through a circuit breaker 22 and into an input 26 of the power protector 24. The current is then directed through a circuit breaker 32 to backfeed into the second electrical buss bar system 10. The output 60 of the second electrical buss bar system 10 passes through a transformer 78 and into a transformed buss bar system 80 to produce a transformed output 86. Further, a supplemental system input 58A can be directed through a supplemental electrical buss bar system 88 through a supplemental infeed circuit breaker 90 which is coupled to another input 74 of the power protector 24.

At least some of the above-described embodiments can be used for paralleling capacities. For example, a parallel infeed circuit breaker 92 can be coupled to the first electrical buss bar system 6. The output of the circuit breaker 92 can be directed towards other uses, such as other electrical loads that may be independent of the power protector 24 or other power protectors coupled to the system. Similarly, a parallel supplemental infeed circuit breaker 94 can be coupled to the supplemental electrical buss bar system 88 for an optional additional system output. Still further, a parallel outfeed circuit breaker 96 can be coupled to the second electrical buss bar system 10 to provide an additional system output that is independent of the output 60. If the transformer 78 is present in the particular system, the system output 60 can be used to supply power thereto.

Figure 5:
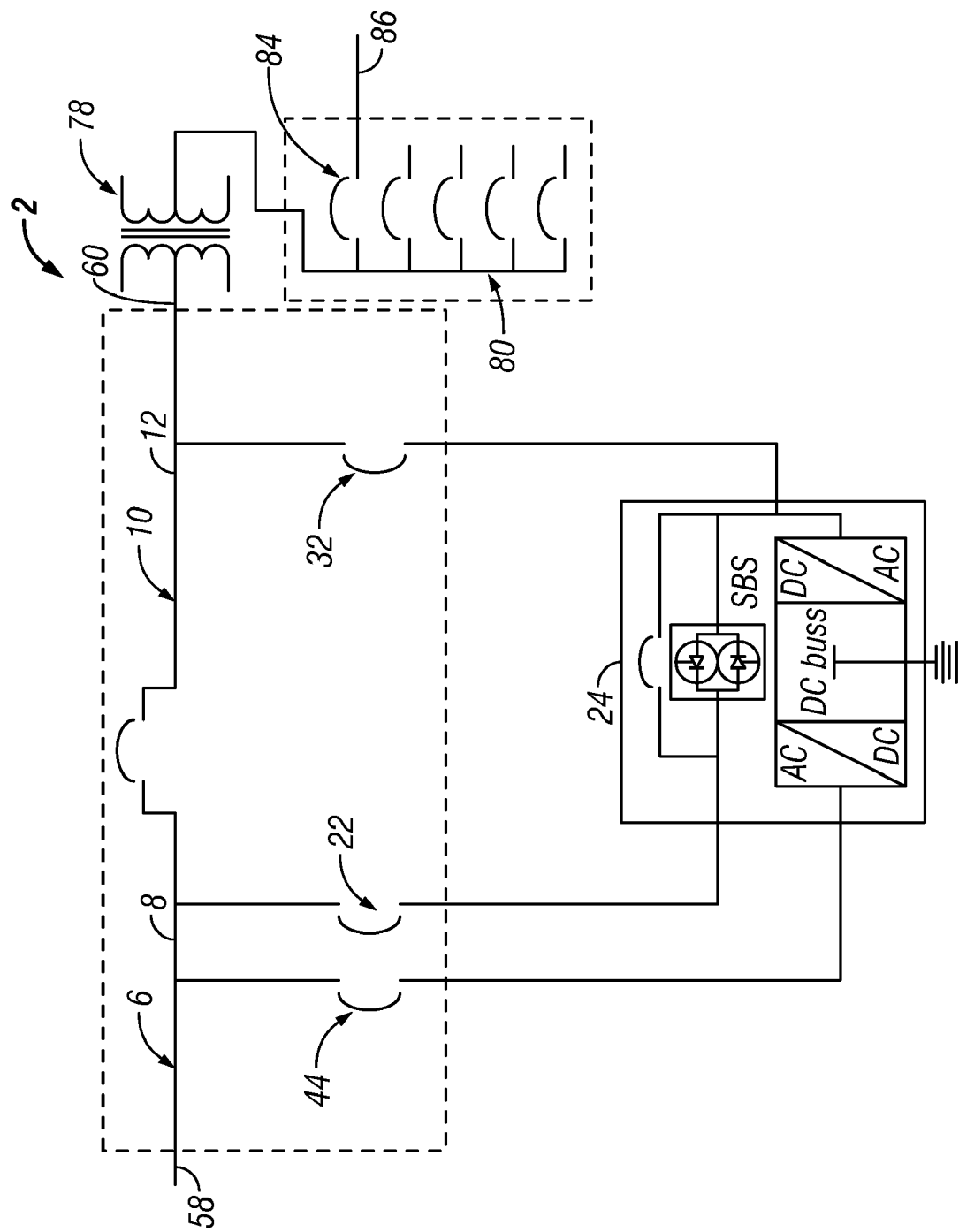
FIG. 5 is a schematic diagram of another exemplary embodiment of the power protection system.
Figure 6:
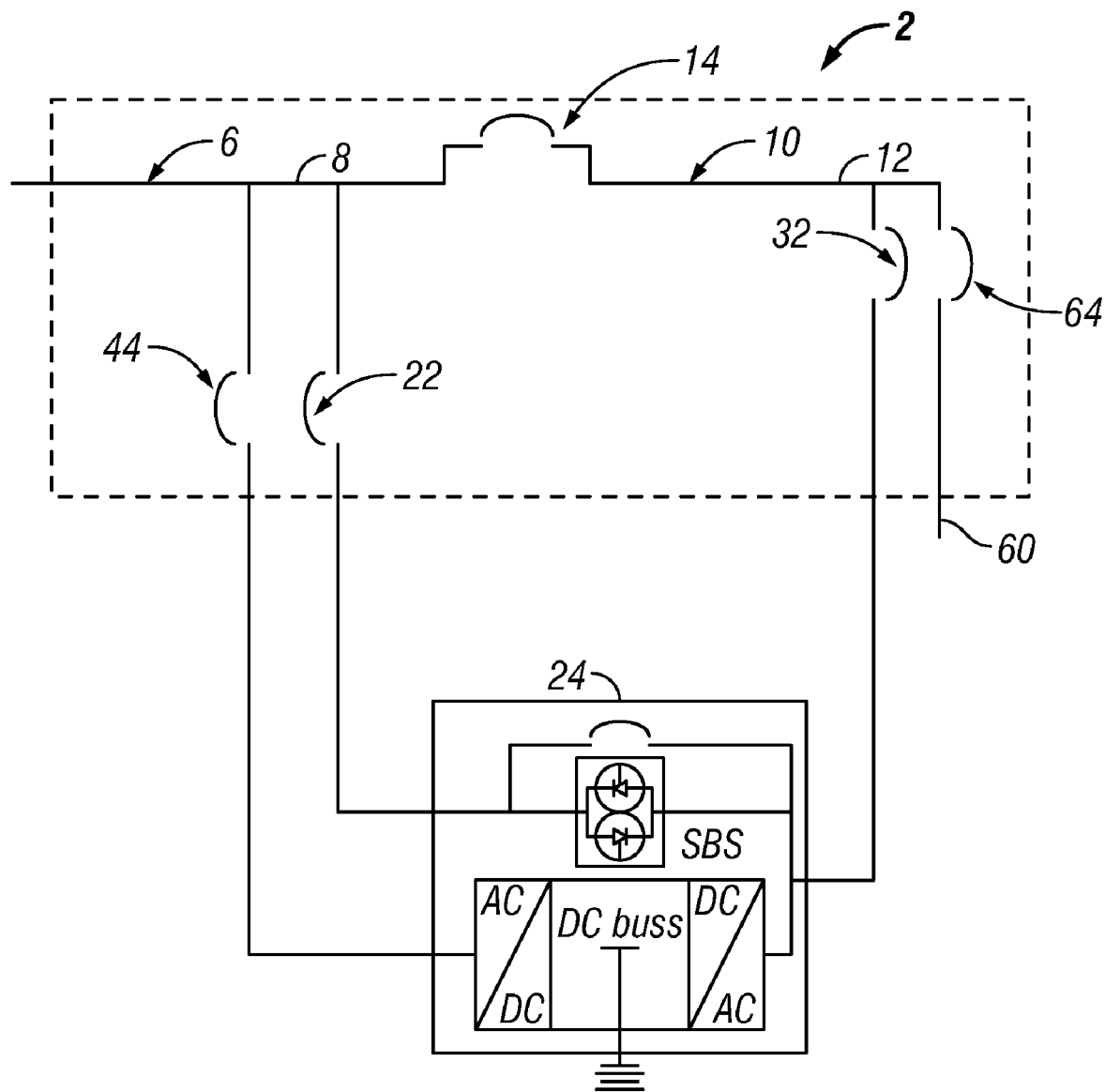
FIG. 6 is a schematic diagram of another exemplary embodiment of the power protection system.

FIG. 5 is a schematic diagram of another exemplary embodiment of the power protection system. FIG. 6 is a schematic diagram of another exemplary embodiment of the power protection system. The figures will be described in conjunction with each other. FIGS. 5 and 6 illustrate embodiments with a single power protector. The current can conduct through the components in like fashion as has been described herein. The power protection system 2 may be sized and designed for specific architectures that may not include some of the parallel circuit breakers and capabilities described above. For example, the first electrical buss bar system 6 may only include one or two of the circuit breakers 22, 44 which are directed toward the single or dual input of the power protector 24. The output of the power protector 24 is directed through the single first outfeed circuit breaker 32 back into the second electrical buss bar system 10 having a buss bar 12. The output of the buss bar 12 can be directed through the transformer 78 into the transformed buss bar system 80 and through the circuit breaker 84 to produce a transformed output 86. FIG. 6 illustrates a similar embodiment without the transformer 78, so that the output 60 is directed toward an electrical load.

The invention has been described in the context of various embodiments and not every embodiment of the invention has been described. Apparent modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

The various methods and embodiments of the invention can be included in combination with each other to produce variations of the disclosed methods and embodiments, as would be understood by those with ordinary skill in the art, given the understanding provided herein. Also, various aspects of the embodiments could be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising", should be understood to imply the inclusion of at least the stated element or step or group of elements or steps or equivalents thereof, and not the exclusion of a greater numerical quantity or any other element or step or group of elements or steps or equivalents thereof. Discussion of singular elements can include plural elements and vice-versa. The device or system may be used in a number of directions and orientations. The term "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion. The coupling can occur in any direction, including rotationally.

The order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention. Other and further embodiments utilizing one or more aspects of the inventions described above can be devised without departing from the spirit of Applicant's invention. For example, the power protector devices can be installed in a cabinet with the circuit breakers or in a separate cabinet coupled to the panelboard, the number of power protector devices can differ from the number of circuit breakers so that some electrical loads do not have power protector protection, the same panelboard can supply a plurality of electrical loads from individual power protector devices and other electrical loads can be supplied by a combination of power protector devices. Other variations are contemplated given the teachings of the disclosure herein.

Further, any references mentioned in the application for this patent as well as all references listed in the information disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicant(s).

The invention claimed is:

1. A power protection system, comprising:
    a first electrical buss bar system having at least one buss bar and a second electrical buss bar system having at least one buss bar;
    a first infeed circuit breaker having an input coupled to the first electrical buss bar system, an output, and a protection device disposed between the input and the output for an electrical current overload condition;
    a first power protector having an input and an output, the first power protector input being coupled to the first infeed circuit breaker output; and
    a first outfeed circuit breaker coupled to the second electrical buss bar system, the first outfeed circuit breaker having an input and an output and a protection device disposed between the input and the output for an electrical current overload condition, the input of the first outfeed circuit breaker being coupled to the first power protector output, the output of the first outfeed circuit breaker being coupled to the second electrical buss bar system to allow backfeed of electrical current into the second electrical buss bar system, and the second electrical buss bar system being adapted to be coupled to one or more electrical loads.

2. The system of claim 1, wherein the first power protector comprises an uninterruptible power supply (UPS) with a battery coupled thereto.

3. The system of claim 1, wherein the first power protector comprises a power line conditioner.

4. The system of claim 1, wherein at least one of the buss bar systems comprises a plurality of buss bars in a stacked arrangement.

5. The system of claim 1, wherein the first and second buss bar systems are coupled within a panelboard.

6. The system of claim 1, wherein the first and second buss bar systems comprise portions of a single buss bar system electrically separated by a bypass switch.

7. The system of claim 1, wherein the bypass switch comprises a circuit breaker.

8. The system of claim 1, wherein the first power protector comprises an alternating current (AC) system for allowing AC to pass through the first power protector when AC is supplied to the first power protector and a direct current (DC) system for allowing DC current to be transformed into a synthesized AC waveform to provide power to the second circuit breaker when AC is not supplied to the first power protector.

9. The system of claim 1, wherein the first power protector is supplied with a single AC input from the first infeed circuit breaker.

10. The system of claim 1, further comprising a second power protector coupled between the first electrical buss bar system and a second infeed circuit breaker on an input of the second power protector, and the second electrical buss bar system and a second outfeed circuit breaker on an output of the second power protector.

11. The system of claim 10, wherein the first power protector is sized to conduct a first electrical load and the second power protector is adapted to conduct a current for the first electrical load when the first power protector is unable to conduct the current for the first electrical load.

12. The system of claim 10, wherein the first power protector is sized to conduct a portion of the first electrical load and the second power protector is sized to conduct a second portion of the first electrical load.

13. The system of claim 1, further comprising a second infeed circuit breaker having an input coupled to the first electrical buss bar system, an output, and a protection device disposed between the input and the output for an electrical current overload condition, wherein the first power protector is supplied with a dual AC input from the first infeed circuit breaker and the second infeed circuit breaker.

14. The system of claim 1, further comprising a plurality of power protectors coupled between the first electrical buss bar system and an infeed circuit breaker on an input of each power protector, and the second electrical buss bar system and an outfeed circuit breaker on an output of each power protector.

15. The system of claim 14, wherein at least one of the power protectors is adapted to conduct a current for an electrical load when another power protector is unable to conduct the current for the electrical load.

16. A method of providing electrical protection to a circuit, comprising:
    providing a first electrical buss bar system having at least one buss bar and a second electrical buss bar system having at least one buss bar;
    coupling an input of a first infeed circuit breaker to the first electrical buss bar system;
    coupling an input of a first power protector to an output of the first infeed circuit breaker;

coupling an output of the first power protector to an input of a first outfeed circuit breaker;

coupling an output of the first outfeed circuit breaker to the second electrical buss bar system; and allowing backfeed of electrical current into the second electrical buss bar system through the power protector, and the second electrical buss bar system being adapted to be coupled to one or more electrical loads.

17. The method of claim 16, further comprising isolating an output from the first electrical buss bar system and an input from the second electrical buss bar system to install another power protector while the first power protector is operational.

18. The system of claim 1, wherein the system is adapted to allow power to flow during normal operation from the first electrical buss bar system to the second electrical buss bar system.

19. The system of claim 1, wherein the system is adapted to allow power to flow during normal operation from the first electrical buss bar system through the power protector to the second electrical buss bar system.

20. The method of claim 16, further comprising allowing power to flow during normal operation from the first electrical buss bar system through the power protector to the second electrical buss bar system.

* * * * *